May 16, 1933.  H. P. ELLIOTT  1,909,910
ADDRESSING AND PRINTING APPARATUS
Filed Aug. 6, 1930  10 Sheets-Sheet 4
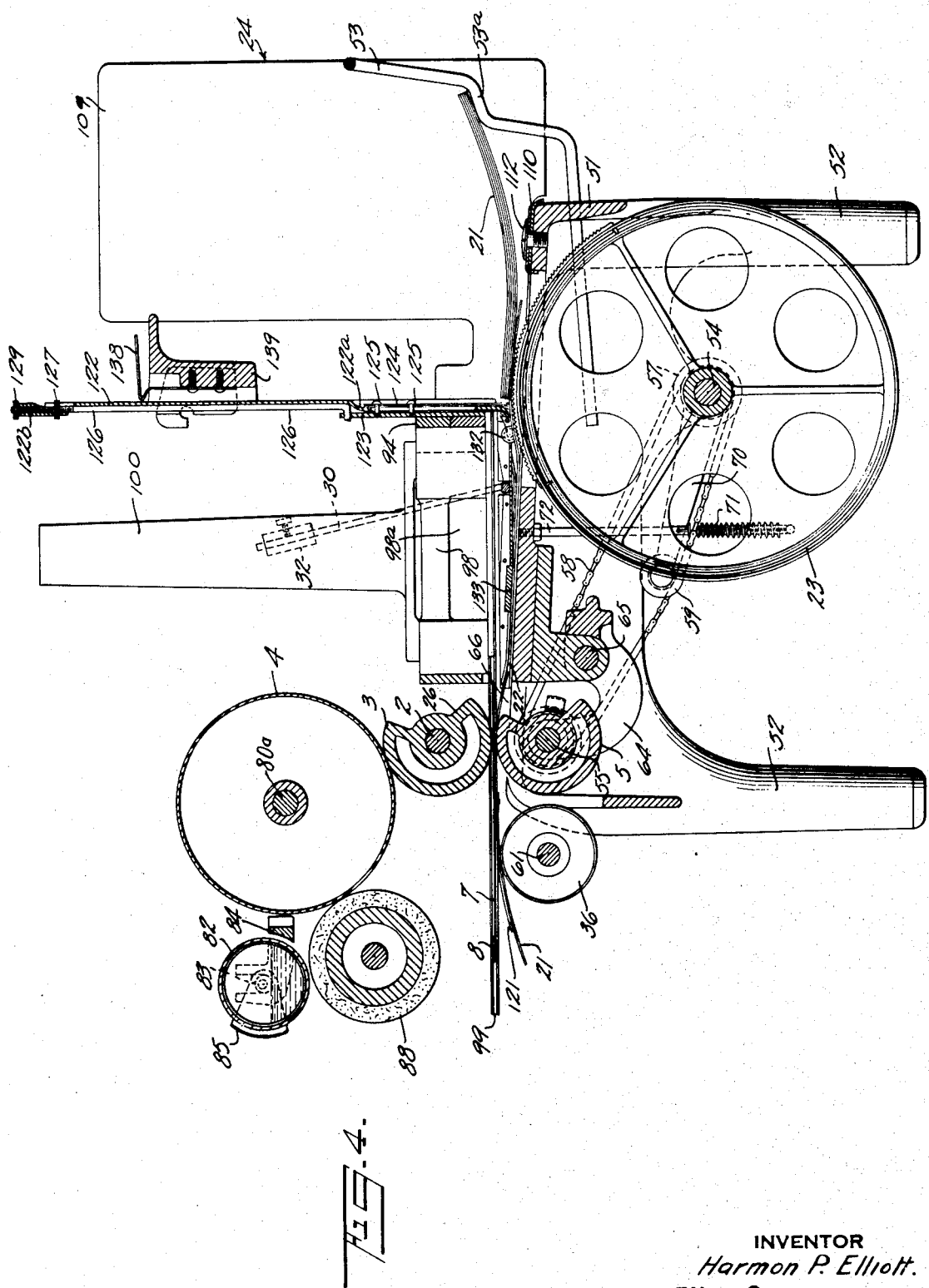
INVENTOR
Harmon P. Elliott.
BY
ATTORNEY

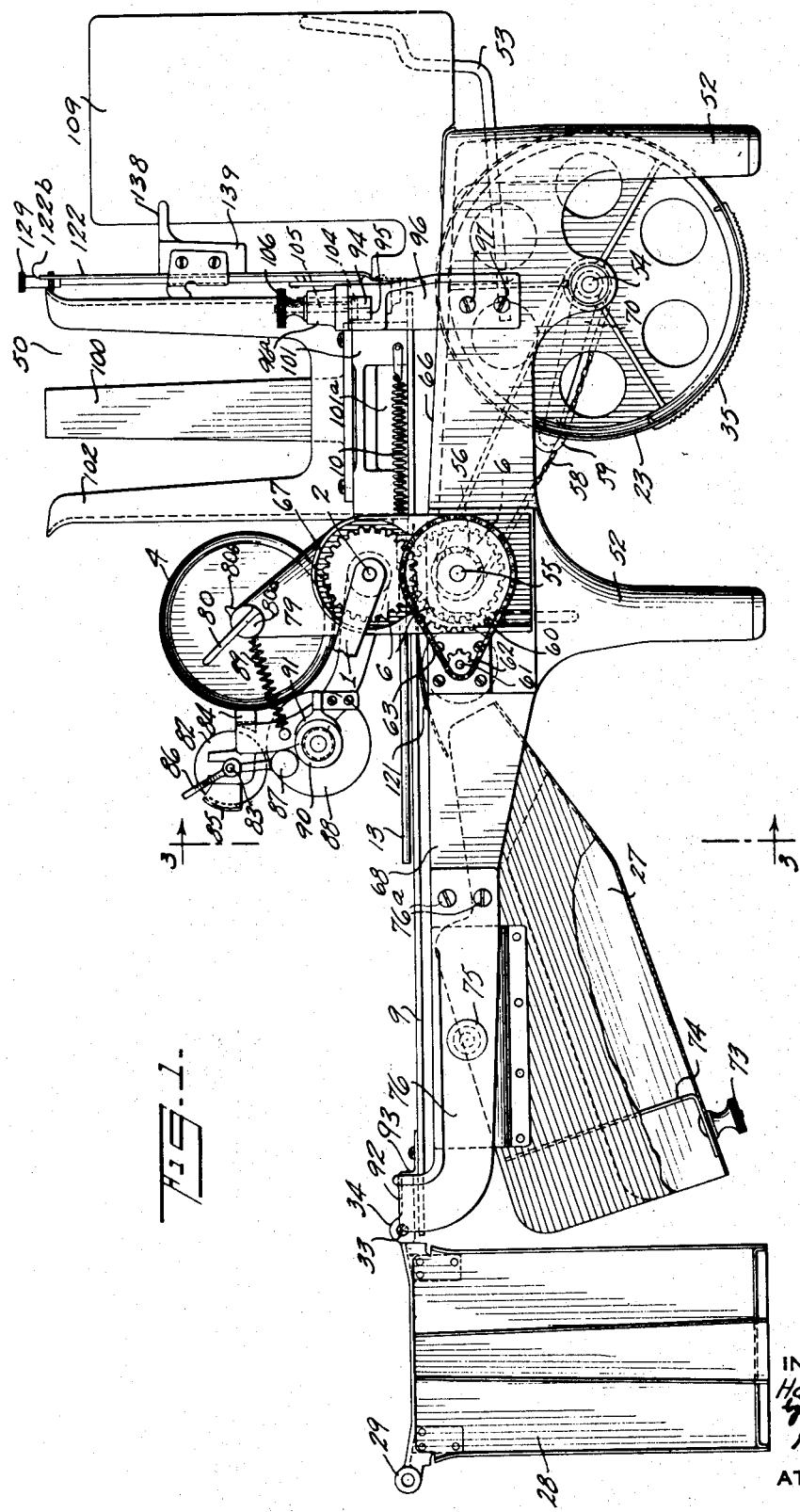

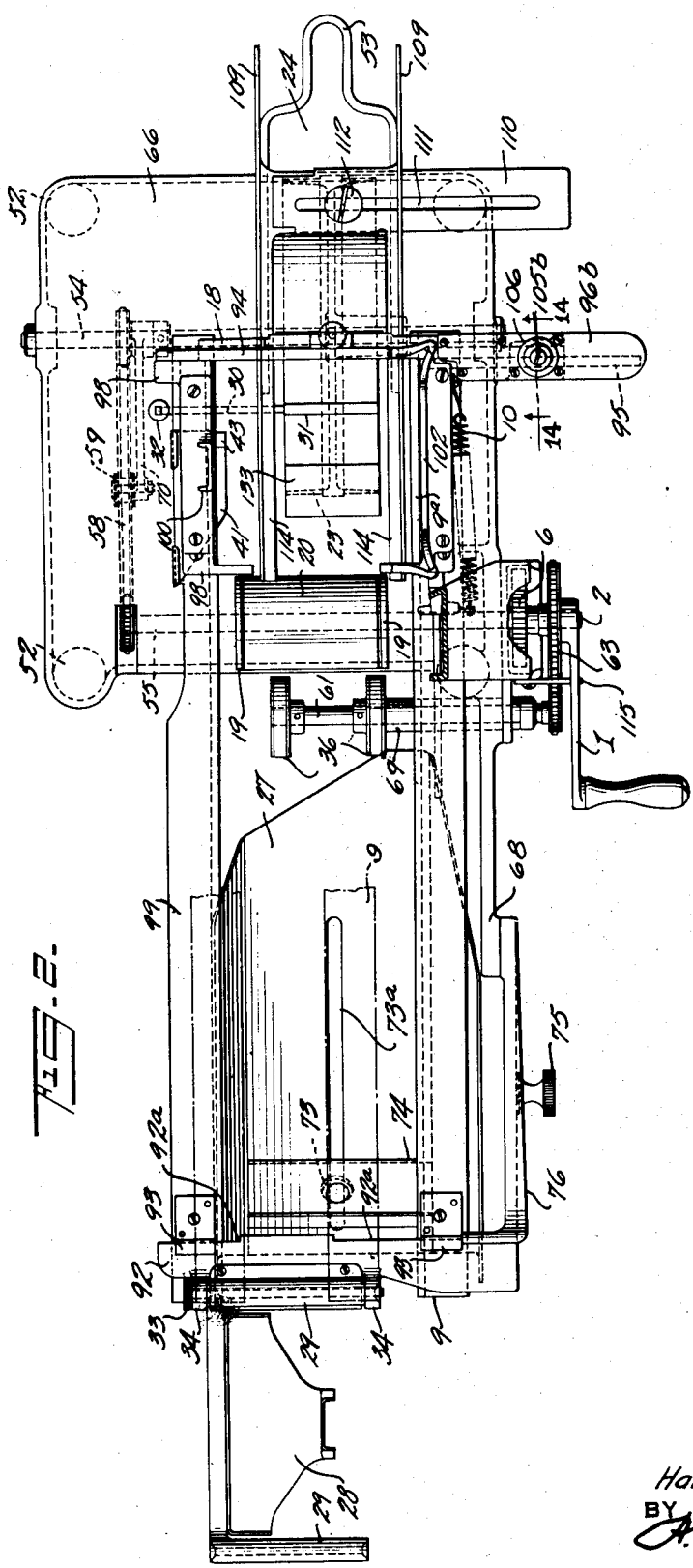

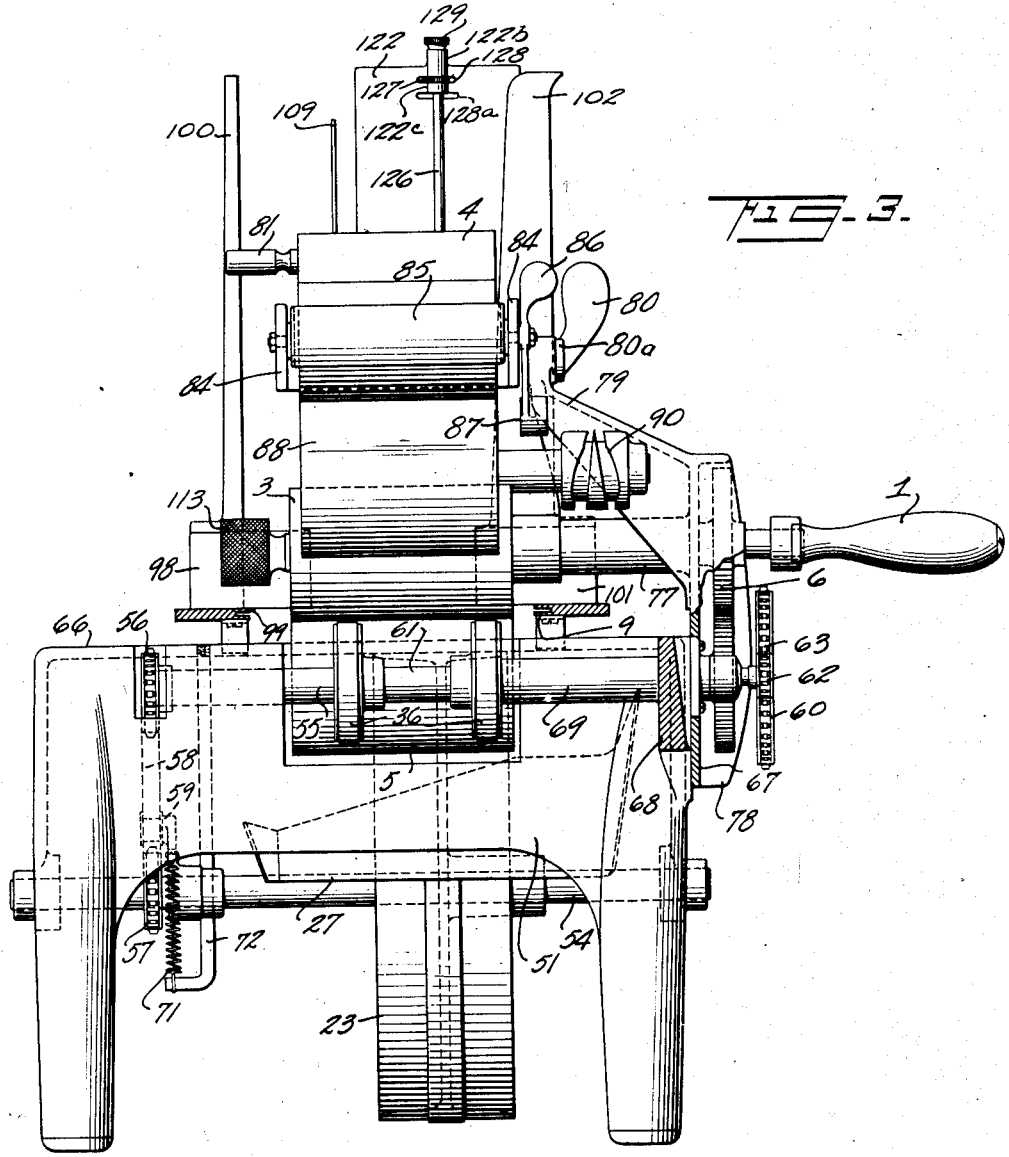

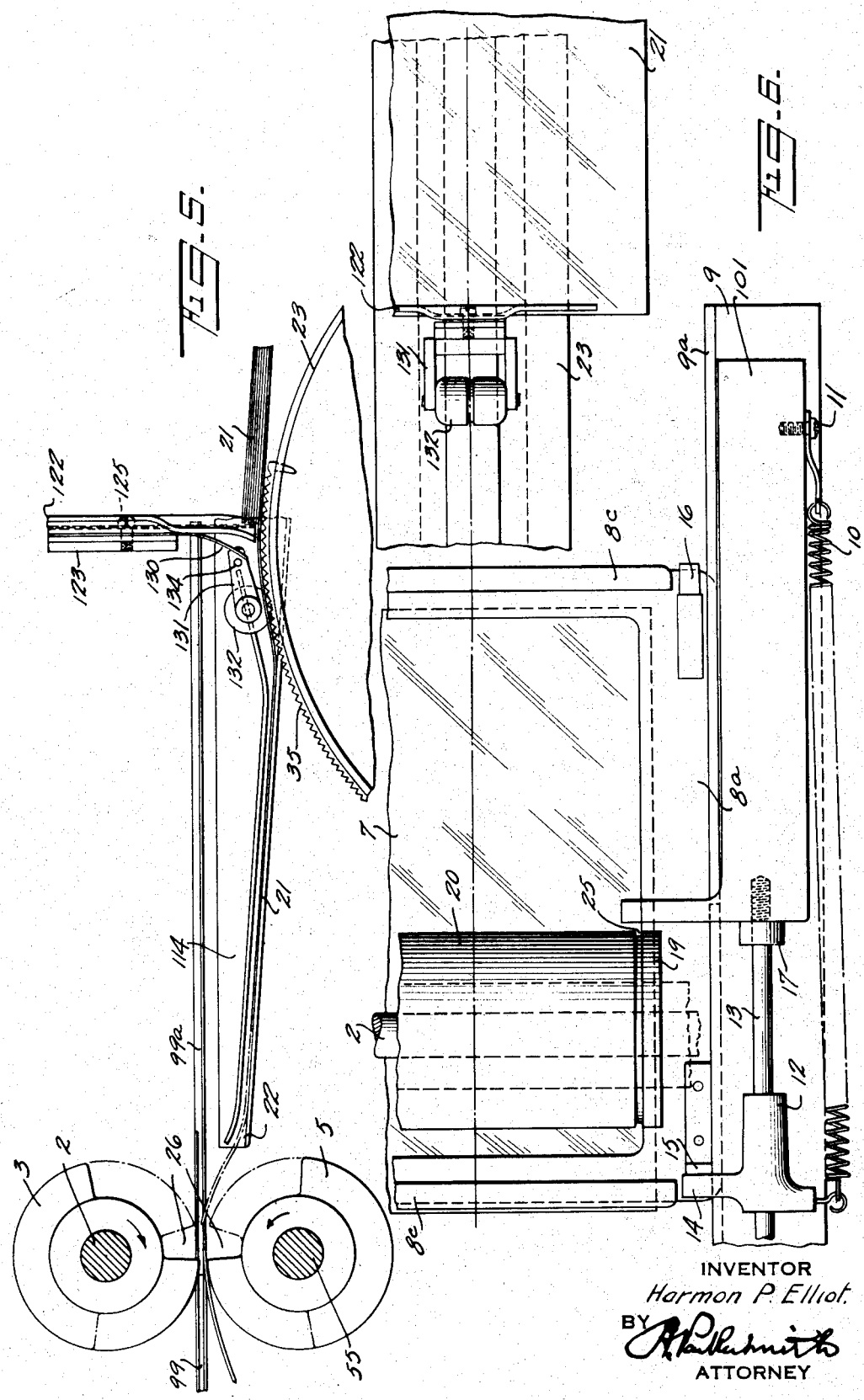

May 16, 1933.  H. P. ELLIOTT  1,909,910
ADDRESSING AND PRINTING APPARATUS
Filed Aug. 6, 1930  10 Sheets-Sheet 6
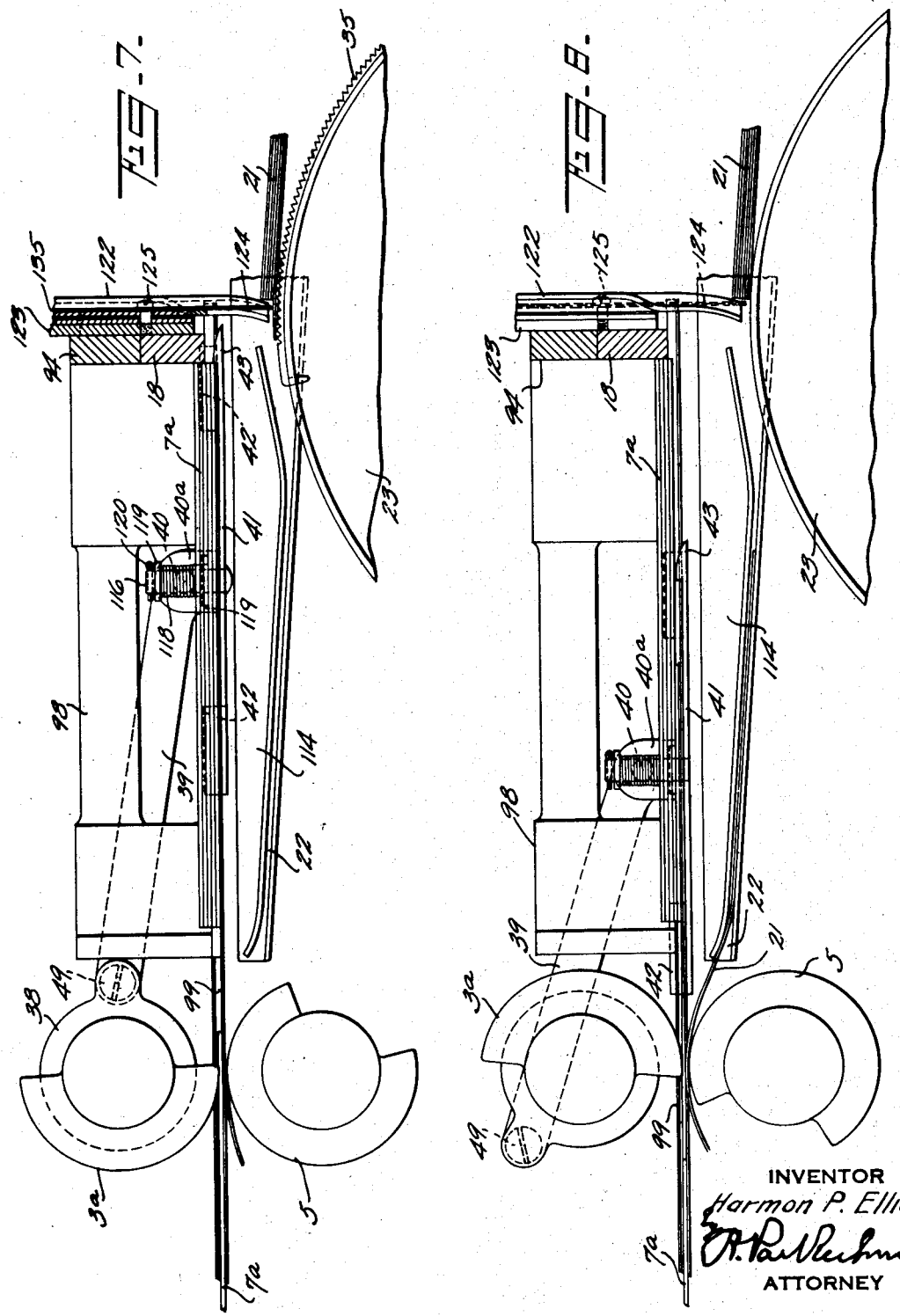
INVENTOR
Harmon P. Elliott.
ATTORNEY

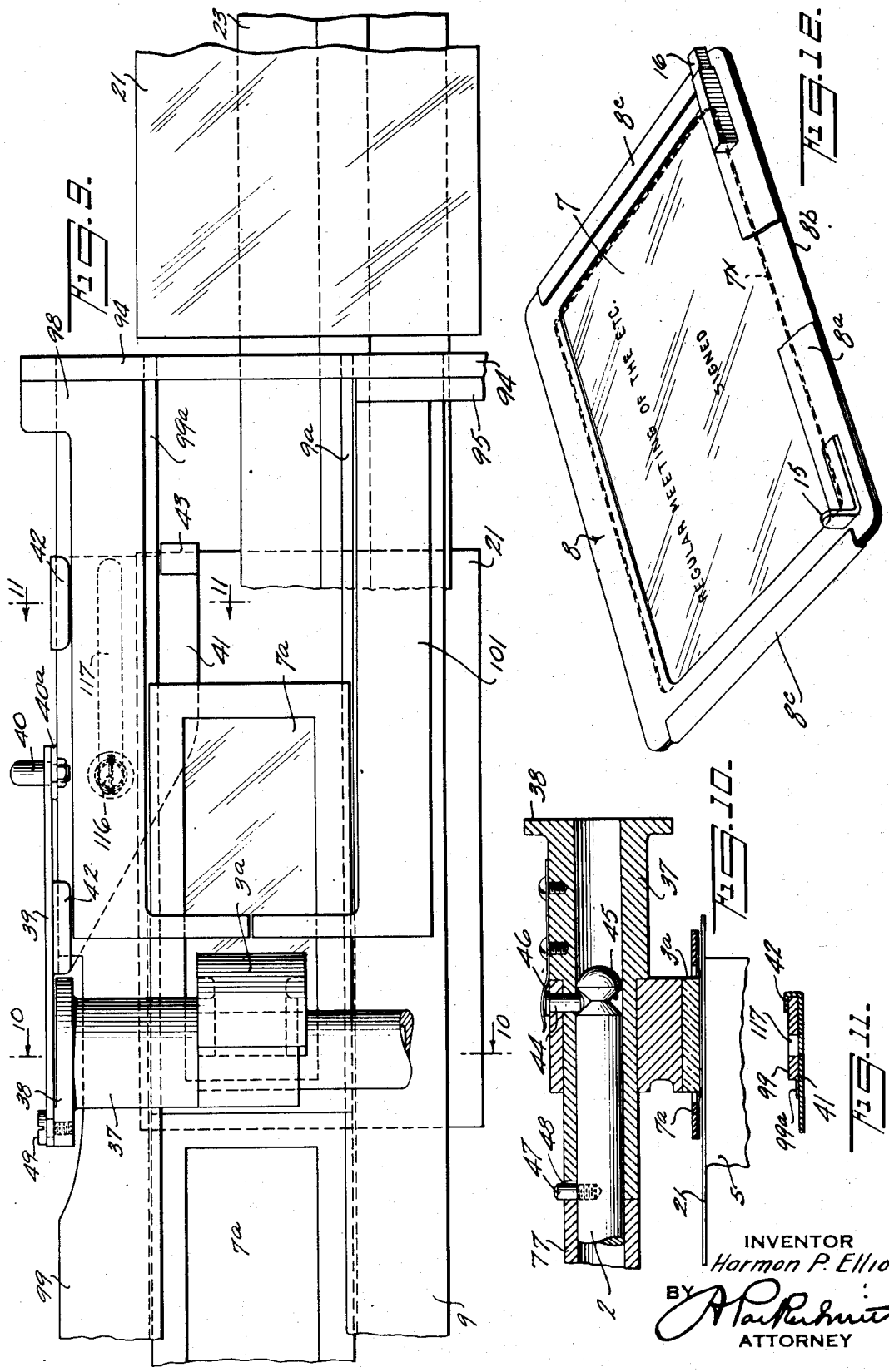

May 16, 1933.  H. P. ELLIOTT  1,909,910
ADDRESSING AND PRINTING APPARATUS
Filed Aug. 6, 1930   10 Sheets-Sheet 8

INVENTOR
Harmon P. Elliott.
BY
ATTORNEY

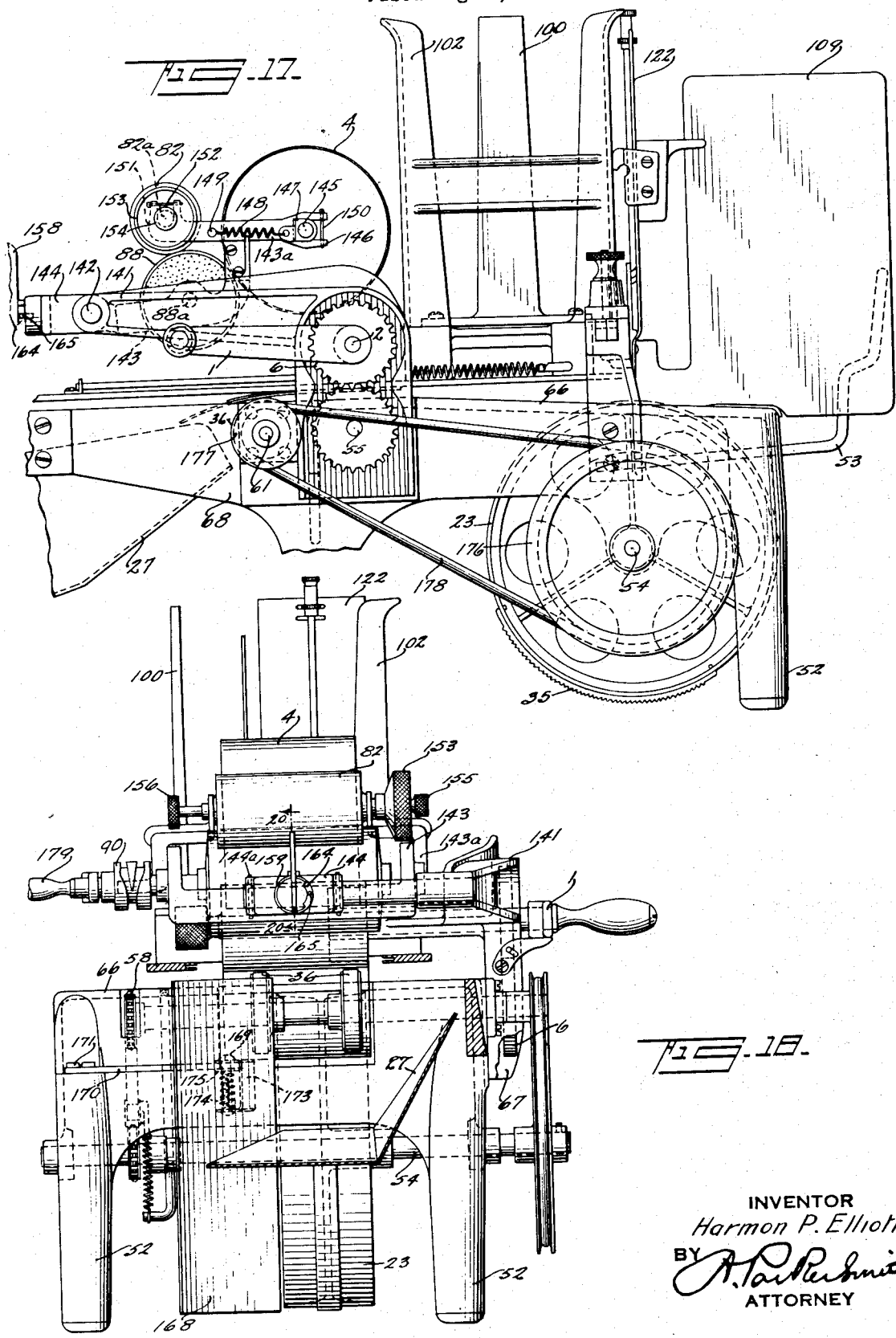

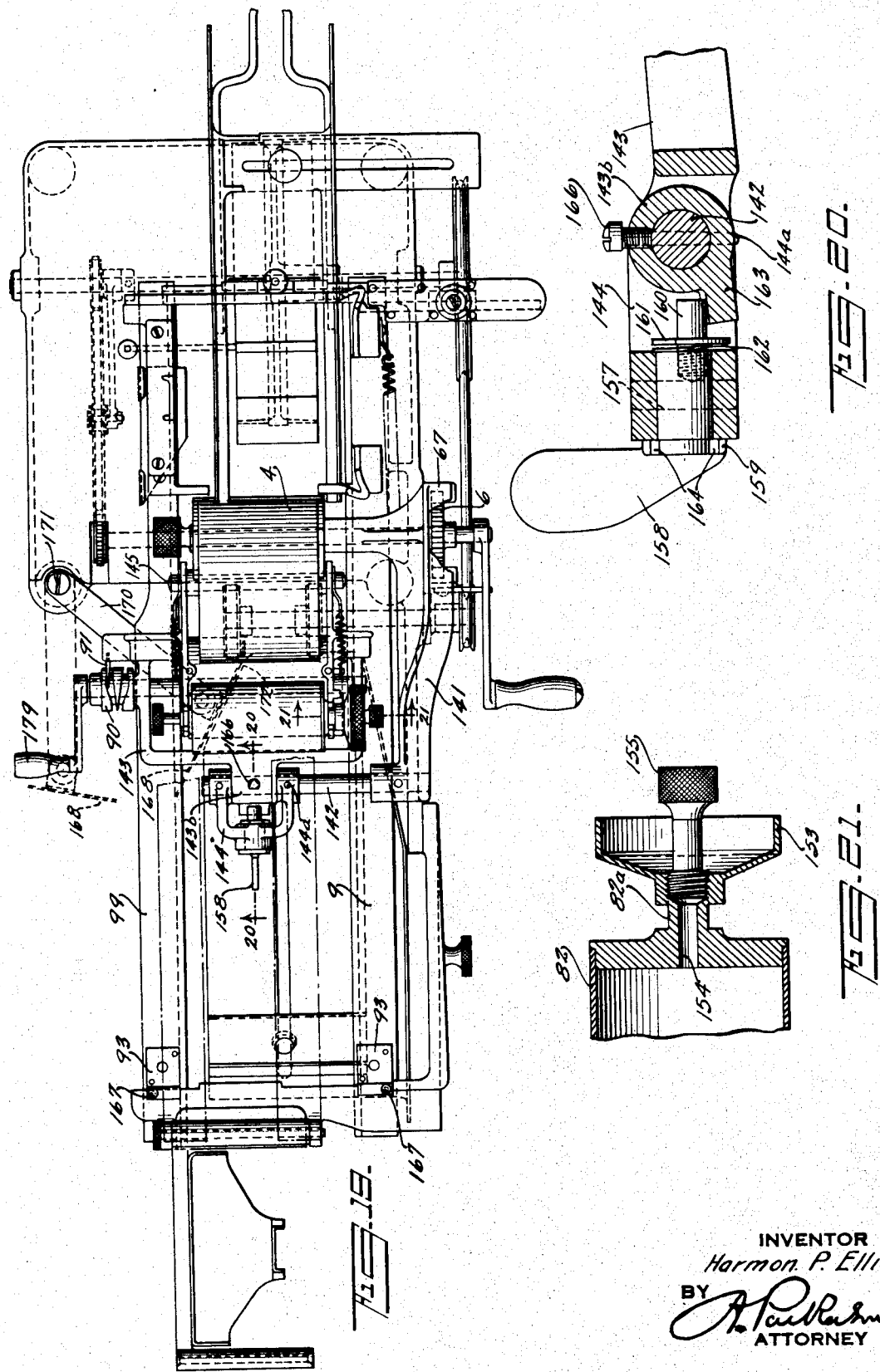

Patented May 16, 1933

1,909,910

UNITED STATES PATENT OFFICE

HARMON P. ELLIOTT, OF CAMBRIDGE, MASSACHUSETTS, ASSIGNOR TO ELLIOTT ADDRESSING MACHINE COMPANY, A CORPORATION OF MASSACHUSETTS

ADDRESSING AND PRINTING APPARATUS

Application filed August 6, 1930, Serial No 473,322, and in Canada April 19, 1930.

This invention relates generally to addressing apparatus of the type illustrated for instance in my Patent No. 1,694,619 granted December 11, 1928, and includes certain improvements in the details of such mechanism hereinafter to be pointed out, but more specifically it embodies additional features of construction which enable the machine to operate with stencils of different widths.

The machine of my said prior patent was primarily designed to produce a continuous series of single printing operations from a set of address bearing stencils which are usually (for hand machines) of a standard, rather small width, and the upper, ink bearing platen sector cooperating with such stencils must have a still narrower face, and only a certain amount of peripheral length. Both of these limitations in dimensions are necessary to prevent the ink bearing face of the platen sector from overlapping the thicker, stencil card frame, that is to say, the ink bearing face of the cooperating ink bearing platen sector must bear only on the thin paper panel of the stencil, and as a result the printing field of the apparatus is sharply limited. The invention contemplated in my said prior patent also involved means for passing one of such smaller, address bearing stencils repeatedly through the printing zone to repeat the printing of the name and address thereon one or more times.

According to the present invention, however, the above limitation of area of the printing field may be overcome, when desired, by making the ink bearing platen sector removable and providing one or more substitute platen sectors of greater ink bearing face area, and also by placing the stencil bearing guides, or track, slightly above the horizontal plane which is tangent to the upper surface of the lower, pressure platen sector, and also making said guides adjustable as to distance of spacing apart so as to be capable of receiving stencils of correspondingly greater width to cooperate with the wider ink bearing sector platen, or platens, said stencil bearing guides being thus movable toward one another over the lower platen sector, when a stencil which is narrower than the width of said lower platen face is to be used. Thus a larger printing field can be secured, when desired, sufficient to include the subject matter of a short letter, or that to be printed on the back of a postal card or postcard. If then means are provided for reciprocating such larger stencil back and forth through the printing zone it is evident that the same machine may be used alternately either to print at one time a series of names and addresses on one side of a series of post cards, or on a series of envelopes, or, at another time, to print any desired message on the other side of said post cards, or on sheets of letter paper to be mailed in the addressed envelopes.

In the preferred form of the present invention I provide a stencil carrying frame of metal in which said message bearing stencil may be inserted, and then reciprocate said carrier and its contained stencil through the printing zone an indefinite number of times after the machine has been adjusted to receive and handle said carrier, the method of reciprocating said stencil carrier being generally the same as that previously applied to an address bearing stencil as described in my above mentioned patent, in that a spring is employed for that purpose.

The best form of apparatus now known to me embodying my present invention is illustrated in the accompanying ten sheets of drawings in which:

Fig. 1 is a side elevation of a hand operated machine constructed in accordance with my invention, parts being broken away or shown in section.

Fig. 2 is a plan view of the same with the inking mechanism and certain other parts removed and still other parts broken away or shown in section.

Fig. 3 is a vertical cross section on the line 3—3 of Fig. 1, parts being broken away and others omitted.

Fig. 4 is a longitudinal vertical section of a portion of the mechanism with parts removed or broken away, the apparatus being in the position occupied while the message bearing stencil and a post card are passing through the printing operation, and another post card is being pulled out of the magazine and fed toward the printing zone.

Fig. 5 is a fragmentary similar view (parts being broken away) showing the apparatus on an enlarged scale in the position occupied after a printing operation has been completed and the stencil carrier and printed card are about to be released, the former to be pulled back for a repetition of the operation on the next post card, which is shown in advancing position in dot and dash lines.

Fig. 6 is a fragmentary plan view (parts being broken away) of the apparatus also in part illustrated in Fig. 5, but in position assumed during the printing operation.

Fig. 7 is a similar fragmentary side elevation of the same mechanism with the substitute parts used for printing addresses on the post cards, these being shown in the positions occupied at the close of a printing operation and just before the used stencils and printed post card are discharged, the feed claw being retracted ready to feed another stencil.

Fig. 8 is a similar view with the printing operation in progress, and the feed claw partially retracted on its way to grasp another stencil.

Fig. 9 is a fragmentary plan view of the same portion of this mechanism in the same position as in Fig. 8.

Fig. 10 is a detail view in axial section of the ink bearing platen sector taken on line 10—10 of Fig. 9.

Fig. 11 is a detail cross section on line 11—11 of Fig. 9.

Fig. 12 is a perspective view of a message stencil and the carrier for same, parts being broken away.

Fig. 17 is a side elevation showing a different form of inking mechanism, parts being broken away.

Fig. 18 is an end elevation of the same.

Fig. 19 is a plan view.

Fig. 20 is an enlarged, detail section on lines 20—20 of Figs. 18 and 19, and

Fig. 21 is an enlarged, detail section on line 21—21 of Fig. 19.

Figure 13:
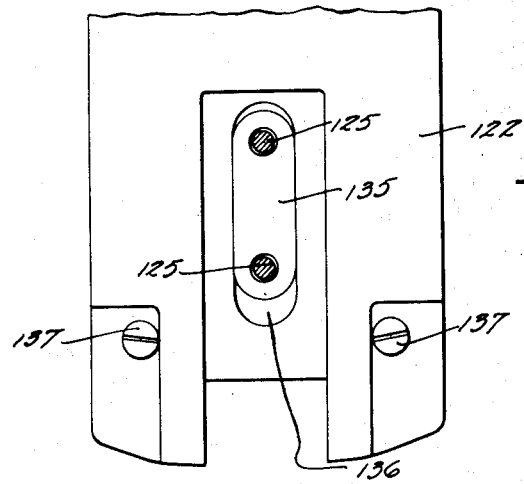
Fig. 13 is a fragmentary view on an enlarged scale showing a part of the gate assembly for the post card magazine.

Throughout the drawings like reference characters indicate like parts. 51 is the main frame which may have a table top 66 and be supported by legs 52, having rubber tips so that the machine may be placed on a desk or table without marring the surface thereof. 50 indicates generally a magazine, for cards having names and mailing addresses stencilized therein, which stencils are to be pulled out one by one, fed through guides to and through a printing zone, together with post cards or other articles to be addressed, which latter are stacked in a magazine indicated generally at 24, which has a skeleton bottom and back formed by bent wire 53. At the other end of frame 51 is the collector 28 used for stencils which are discharged into it from the end of the usual grooved card guides 9 and 99, while the printed post cards or other printed articles are deposited in receptacle 27. The printing is done by the cooperation of a proper stencil and revolving inking and pressure platen sectors, such as 3 and 5, shown in Figs. 4 and 5, or 3a and 5 shown in Figs. 7, 8 and 9, platen sector 3 being used when repeat printing is to be done, such as the printing of a message on post cards to be mailed to all the members of a social or professional organization, and platen sector 3a being used for straight addressing of such cards or other articles, the addresses usually being stencilled on one side of each card and the message on the other.

Fig. 1 is a side elevation showing the operating hand crank 1 broken away. This crank is fast on the shaft 2 carrying the upper platen sector 3, the outline of which latter is shown in Figs. 4 and 5, while its substitute 3a is shown in Figs. 7 and 8. Whichever upper platen sector is mounted on this shaft has ink supplied to it from inking roll 4 (Figs. 1 and 4) which receives it from any suitable ink supply apparatus such as the one there indicated, and which will be described more in detail hereinafter. Either ink carrying platen cooperates with the lower platen sector 5, which latter is driven from the former by gearing 6 (Figs. 1 and 3). The upper platen sector 3 is used in printing the message on one side of each post card. This is done with the cooperation of a stencil 7 mounted in a rectangular carrier frame indicated generally at 8, and shown in detail in Fig. 12. This carrier 8 is slid by hand part way into the usual grooved guides 99 and 9, (see Figs. 9 and 11) along which the usual form of stencil cards slide to the printing zone, (in which the revolving platen sectors are located) when the addresses (instead of the message) are being printed on the other sides of the stencil cards,—the other inking platen sector 3a (Fig. 9) then being used.

The stencil carrier 8 is normally retracted by tension spring 10, anchored at 11, and having its free end connected to the slide 12 (best shown in Fig. 6), which slide can be reciprocated on guide rod 13. This slide has a laterally projecting lug 14 which extends in front of an upwardly projecting lug 15 on one forward corner of stencil carrier frame 8. Normally such spring 10 holds the slide 12 back against, or near, the rubber bumper 17 mounted on guide rod 13, and, in turn, lug 14 on said slide then holds stencil carrier 8 back in retracted position with its rear bumper 16 resting against a horizontally extending cross bracket 18 (Fig. 2) supported on the main frame 51. Said carrier 8, however, is of such length that, even when in this retracted position, its front end extends within and slightly beyond the "bite" of the platen sectors 3, and 5, when the latter are revolved by rotating hand crank 1 in a clockwise direction, looking at Fig. 1. The upper sector 3 has end portions 19, 19 (Figs. 2 and 6) which are separated by narrow grooves 25 (see Fig. 6) from the inking surface 20, and are outside of the ends of inking roll 4, so they receive no ink. They bear on the inner portions of the sides of stencil carrier 8. When the sectors are revolved through a small angle from their position of rest (as shown in broken lines in Fig. 5) they grasp the forward portions of the sides of stencil carrier 8 between them and thereafter pull it, together with the stencil carried by it, along to the left (looking at Fig. 5) stretching spring 10.

The stop formed by the bracket 18 is, as shown in Fig. 7, wholly above the plane of the upper surfaces of the guides 9 and 99, as is also the laterally projecting lug 14 on slide 12, so that after the removal of the frame 8 the space between the guides will be left free and there will consequently be no interference with the adjustment of the guides for the use of the addressing stencils hereinafter described, nor with the passage of a succession of address bearing stencils therethrough when address printing is being done.

The carrier 8 for the message stencil, as best shown in Fig. 12 and hereinafter described more in detail, is formed of thin sheet metal which is itself slightly flexible in a direction at right angles to the plane of its face. When resting free in the grooves in guides 9 and 99 its under surface lies in the plane of the lower walls of said grooves, said plane being, of course, slightly above the level of the horizontal plane tangent to the uppermost portion of the curved surface of the lower platen sector 5, which latter plane is that of the under, exterior surfaces of guides 9 and 99. When the ends 19, 19, of the upper platen sector 3 press down on the inner edges of carrier frame 8 in the message printing operation the latter are flexed downward slightly until the under surfaces of the inner edges thereof bear on the post card or sheet of paper being printed, which of course is supported at the printing point by the surface of the platen sector beneath. At such time the frame, and postcard and the perforated or partly perforated area of the stencil 7, are grasped between the two platen sectors in the usual way and some of the ink carried by the portion 20 of the face of upper platen sector 3 is then forced through the stencil onto the post card, or sheet of paper, on which the printing is to be done. To permit this last described printing operation the portions of the end sections 19, 19, of the sector 3 are necessarily compressed and flattened at their points of contact with frame 8, to an extent slightly in excess of that to which the ink bearing portion 20 is similarly compressed and flattened in such printing operation, all portions of the sector surface being formed of a slightly compressible rubber compound. As a result the printing area of stencil 7 is also further flexed downward a distance about equal to the thickness of the under portion 8b of the two-part carrier frame 8.

At the same time a postcard 21, which has previously been fed forward through guides 22 (Fig. 5) by feed drum 23 from the bottom of the stack in a magazine represented generally by 24 (Fig. 4) to a position shown in broken lines in Fig. 5, has reached a position under stencil 7 such that its forward end is also grasped by the revolving sectors, together with the stencil bearing carrier 8. Further rotation of the platen sectors then pulls the stencil 7, superposed on postcard 21, between them and forces ink through the stencil onto the upper surface of the postcard, thereby printing on the postcard the stencilled message or other matter. Drum 23 has a roughened rubber surface strip 35 to give frictional contact with the postcard during the proper portion of each revolution of said drum.

When any one revolution of the platen sectors is completed the portions of the cutaway sections 26, 26, thereof have come opposite one another, with the result that the stencil carrier 8 is then released from their grip, and spring 10 thereupon snaps it, and the message stencil 7 carried thereby, back into retracted position, ready for another cycle of operations on the next postcard when one is fed out of the magazine 24. The discharge of the printed postcard into the receiver 27 (see Fig. 1) is ensured and completed by revolving friction wheels 36, 36 (Figs. 2 and 4). Spring strips 121, each fastened at one end to the under face of a stencil guide, hold the printed postcard down on the peripheries of discharge wheels 36, 36, which may be faced with rubber. Various friction and gate devices hereinafter to be described control the above outlined feeding of postcards or other articles to the printing zone.

Before or after the message has been printed on one side of each postcard, in the manner above described, the addresses from the mailing list are printed on the other side of said cards. For this purpose a stack of address bearing stencil cards 7a are used, they being fed from the usual stencil magazine (indicated generally at 50) by a reciprocating slide 41 held under stencil guide 99, said slide having a stencil feed claw 43, of the usual type, at its rear end, travelling in the plane of the grooves in the stencil guides 9 and 99, and grasping the bottom stencil at its rear end, near one corner thereof.

Slide 41 has a trapezoidal shape as shown in plan view (Figs. 2 and 9) and is but little wider than stencil guide 99 under which it reciprocated. It is guided and held to 99, by clips 42 on its outside edge and by pin 116 which is set in the slide and passes up through slot 117 in 99. It is also yieldingly held against the under side of 99 by spiral spring 118 which surrounds pin 116 and is confined thereon between loose washers 119, 119, by cotter pin 120, the lower washer 119 bearing on the top face of 99, as shown in Figs. 7 and 8. The rear portion of 99 is reduced in width along a portion of its length adjacent to that over which slide 41 reciprocates as shown in Figs. 2 and 9. This is done to leave a space in which crank disc 38 may rotate. Each address bearing stencil 7a is thus fed to a position such that a platen sector 3a can grasp the stencilized panel portion thereof and pull it further along through the printing zone.

For this address printing a platen sector 3a (Fig. 9) with narrower and shorter inking face is used, and this is mounted on sleeve 37 which slides on and off shaft 2 (Fig. 10), being yieldingly held in position thereon by pin 44 pressed by spring 46 into engagement with circumferential groove 45 on shaft 2. Sleeve 37 is held in proper position, as to circumferential adjustment on shaft 2, and caused positively to revolve therewith, by radial pin 47 set in said shaft and engaging notch 48 cut in the inner end of sleeve 37. (See Fig. 10).

Slide 41 is reciprocated by connecting rod 39 pivoted at one end to crank pin 49 on crank disc 38 formed on the outer end of sleeve 37 and having a notch in its other end adapted to hook over pin 40 or ear 40a on said slide. The inking platen sector 3, used in printing the message as previously described, is similarly removably mounted on shaft 2, and one or the other is installed thereon according to whether a message printing or an address printing operation is to be performed.

In effecting the change over from message printing to address printing the message printing inking platen sector 3 is first removed by grasping the knurled head of screw 113, which is set axially in its outer end, and the address printing sector 3a is thereafter installed in its place on shaft 2. The stencil carrier 8 and its contained stencil is also removed by simply lifting it out of card guides 99 and 9. The connecting rod 39 is hooked over pin 40 on slide 41. A stack of address bearing stencils is deposited in magazine 50 with the lowermost one resting in guides 9 and 99, which have been moved closer together to receive the narrower stencils, and a stack of postcards (with their unprinted faces looking upward) are deposited in magazine 24. When hand crank 1 is rotated, as before, the address bearing stencils are fed, one at a time, to the printing zone, to which postcards are simultaneously fed (as before) by drum 23, and the completely printed cards (each now bearing the message on one side and an address on the other), are deposited in receiver 27, ready for mailing.

When the machine is next changed over to do message printing all stencil cards are removed from magazine 50, the platen sector 3a is pulled off of shaft 2, and platen sector 3 slipped on said shaft in its place. Connecting rod 39 is unhooked from pin 40, and slide 41 is shoved back (to the right, looking at Figs. 7 and 8) so that its claw 43 will be to the rear of the stencil magazine. The stencil guides 9 and 99 are then spread apart to receive message stencil carrier 8 when the latter is slipped down into said guides to rest in the position previously explained and best shown in Fig. 6, and the apparatus is ready for printing the message on any cards stacked in magazine 24.

As before intimated, it will be necessary to adjust the stencil guides 9 and 99 toward and from each other to enable them to receive and guide either the wider carrier 8 for the message stencil 7 to and from the printing zone during the printing of the message, or to receive and guide the narrower address bearing stencils 7a from magazine to collector 28 during the addressing operation. This is accomplished by use of separate, movable members arranged to support the two guides 9 and 99 at a level slightly above the meeting plane of the platen sectors 3, or 3a and 5, as best shown in Figs. 3 and 10.

As the guides 9 and 99 are located slightly above the meeting line of the sectors 3 or 3a and 5 to enable them to be adjusted over the sector 5, each of the stencils 7 and 7a is made slightly flexible so as to enable the portion thereof on which the sector 3 or 3a bears to be bent down thereby in the printing operation as before explained.

Figure 14:
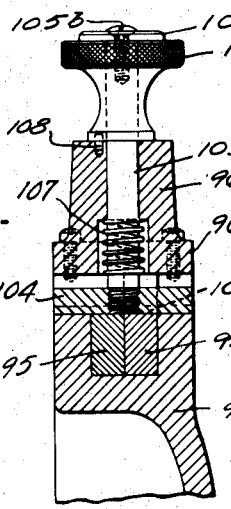
Fig. 14 is a detail cross section on line 14—14 of Fig. 2.

The extension 76 of a horizontal arm 68 on the main frame has a horizontally extending bracket 92 (Fig. 2) projecting at right angles to it, and with which clips 93, 93, on stencil guides 9, and 99 have sliding engagement. This permits the delivery ends of the guides 9 and 99 to be slid toward or from one another (within limits defined by notches 92a) for the above described purpose. The other, or receiving ends of the slide guides are separately supported on slide bars 94, and 95, which are mounted in a housing 96 fastened to the side of the main frame 51 by screws 97, 97 (Fig. 1). The horizontally extending bracket 18 on this housing lies over the table 66, and forms a guide for the longer slide bar 94, which has its free end fastened to the casting 98, which extends horizontally at a right angle thereto and forms the base to which the upright 100 is screwed to serve as the rear side of the stencil magazine 50, and to the under side of which base member the receiving end of the rear stencil guide 99, is fastened. This casting 98 has an open space 98a in its under side in which pin 116 on slide 41 reciprocates. The other, and shorter, slide bar 95 similarly has its free end fastened to one end of another similar casting 101, forming the base of the front of the stencil magazine, and to the top of which casting 101 the bifurcated upright 102 is secured to serve as the upper portion of the magazine front, which casting 101 also has an open space 101a in its under side. (See Fig. 1.) The receiving end of the front stencil guide is fastened to the under surface of casting 101 and is supported thereby. Guide rod 13 for the spring controlled slide 12, previously described, is screwed into the free end of casting 101 (as shown in Fig. 6) so that said guide and slide are adjusted laterally with the stencil guide 9, thus preserving always the same positions, relative thereto. The grooved stencil guides 9 and 99 are therefore free to be moved toward or from one another (by moving slide bars 94 and 95) to receive and hold address bearing stencils 7a or the wider stencil carrier 8. The former position is shown in broken lines in Fig. 2, and in full lines in Fig. 9, while the latter is shown in full lines in Figs. 1 and 2. To hold these parts in the different described positions the slide bars 94 and 95 have notches 103 cut in their upper edges for receiving a vertically movable key 104, as indicated in Fig. 14. This key has an upwardly extending shank 105 projecting through a boss 96a on the cover plate 96b for the housing 96. A knurled sleeve 106 is loosely mounted on the projecting end of this shank, being retained thereon by washer 105a held by screw 105b. This key is normally forced downwardly by spring 107 coiled around shank 105, and nested in an annular recess in the lower portion of boss 96a. The lower end of sleeve 106 carries a downwardly projecting prong 108, normally nesting in a socket hole in the upper face of boss 96a when the key is engaging notches 103. To shift the slide bars 94 and 95, the key is first lifted by pulling up on sleeve 106 and then turning it so prong 108 will no longer register with its socket hole. The stencil guides and magazine sides are then moved laterally until other notches 103 register with key 104. When, or just before, the slides 94, 95 have reached their new location so that prong 108 then registers with its socket in 96a, thus permitting the key to drop into normal locking engagement, and hold the parts in a new position of adjustment.

The magazine for the postcards, or other articles on which the printing is to be done, generally indicated at 24, is also adjustable as to cross section to receive cards or envelopes of different sizes. Its bottom and back are formed by the bent wire 53, the prongs of which bent wire can be slid inwardly or outwardly through holes in the end wall of main frame 51, to accommodate cards or envelopes of different lengths. The sides of this magazine are formed by vertical plates 109, 109, which have laterally and horizontally extending and overlapping feet 110, slotted at 111 to receive a common clamping screw 112 set in the table top 66, this being best shown in Figs. 2 and 4. These side plates 109 also have horizontal extensions 114 (Fig. 2) located under stencil guides 9 and 99, in which extensions the side grooves forming the post card guides 22 (best shown in Fig. 4) are located. This causes the width adjustment of these guides always to correspond to the width adjustment of the card magazine.

The front wall of this magazine for post cards or envelopes is formed by the upright plate 122 (Figs. 1 and 4) the lower end of which is held by screws 137 (Fig. 13) to the cross bracket 18, which also supports the receiving ends of the stencil guides 99 and 9 as before described. The lower portion of this plate 122 is dished out at 122a to form a depression for flat, spring sheets, 124, which form the lower edge of the gate for preventing all but the lower post card or envelope in the magazine stack from being fed forward to the printing zone. There is a slot 136 in the middle of said dished portion 122a of plate 122 (see Fig. 13) in which slides a short block 135, made slightly thicker than plate 122, and having two perforations through which screws 125 (shown in cross section in Fig. 13) may pass to the gate back-plate 123. These screws also pass through spring sheets 124, and through spring sheet 130, which latter supports housing 131, for presser foot roll 132. When said screws 125 are tightened up to hold said gate assembly together the combined gate structure is movable vertically in the slot 136 in upright plate 122, to adjust it so as to permit only the lowest post card in the magazine stack to be fed out by drum 23 into guides 22. The above described adjustment is controlled by rod 126 which has its lower end fastened to back-plate 123, and its upper, screw threaded end passing through knurled nut 127, one edge of which extends through slot 128 in the upper end of upright plate 122. The upper end of rod 126 is guided by a short half-sleeve 122c, stamped out between slots 128, and 128a in plate upright 122, and by sleeve 122b formed at the extreme top of said plate by bending small portions thereof into a circle. The nut 127 is held between these two sleeve sections 122b and 122c so that when it is revolved the rod 126 and gate assembly are raised or lowered. This also varies the pressure of roll 132, on any postcard being dragged under it by friction of rubber band 35 on drum 23. The gate assembly can be locked in any position of adjustment by jam nut 129 mounted on the extreme upper end of rod 126 and engaging the upper end of sleeve 122b.

Bent wire 53 is usually adjusted so that the rear edge of the lowest post card rests on the step 53a, which pitches the cards forward, causing the front edge to rest heavily on drum 23. The resulting frictional engagement is increased by weight 139 sliding up and down on plate upright 122. When this weight is lifted far enough its spring 138 slips over and engages the edge of nut 127, projecting through slot 128, and so holds the weight up to permit insertion into the magazine 24 of a new stack of post cards or envelopes.

The stencil carrier 8 is composed of a thin flexible rectangular frame 8a, usually made of steel, carrying the lug 15 and bumper 16 on its upper face, as best shown in Fig. 12, combined with another frame 8b of approximately the same outline, usually made of thin, flexible brass, which is placed under 8a and may be held in such position by clips 8c, 8c, formed by bending upwardly and inwardly projecting end portions of under frame 8b, the clips extending along only portions of the ends of the frame 8a so as not to enter the grooves of the guides 9 and 99. The stencil 7, which may have a frame 7x of very thin cardboard, or of paper which is thicker and stiffer than the stencilized panel, is inserted between 8a and 8b, after the flap 140 (see Fig. 15) has been torn off.

The upper walls of the grooves in stencil guides 9 and 99 are cut away throughout those portions of their lengths extending under stencil magazine 50, as shown at 9a and 99a in Figs. 2, 6 and 9, so that the bottom stencil 7a, in the magazine stack will lie on the bottom walls of the guides, in line with the grooves therein when the machine is adjusted for printing addresses. The carrier 8, when containing a message bearing stencil 7, has a thickness approximately equal to that of the cardboard frame of an address bearing stencil 7a, so that it also may be inserted in the stencil guide grooves when it has been slid along the lower groove-walls left exposed by the cutaway portions 9a and 99a of the stencil guides. As this carrier is longer than the address bearing stencils 7a, its forward end then projects into this groove, the sides of the magazine 50 having been first spread apart, together with stencil guides 99 and 9, to permit such insertion of carrier 8 with its enclosed message bearing stencil 7.

The details of the preferred form of postcard feeding and discharging mechanism here illustrated and previously referred to are as follows: Feed drum 23 is mounted on a shaft 54 journaled in main frame 51, and is driven from shaft 55, which carries lower platen sector 5, by sprocket chain 58 running over sprocket 56 fast on said shaft 55 and around sprocket 57 fast on said drum shaft 54, this chain and sprocket gearing being located at the back of the machine, as shown in Fig. 2. Shaft 55 is journaled in a swinging housing 64 pivoted at 65 in lugs depending from the under side of table 66, as indicated in Fig. 4. Said swinging housing extends to the right (looking at Fig. 4) and may be there held down by a compression spring, in the manner shown in Figs. 5 and 6 of my above mentioned Patent No. 1,694,619, or otherwise, so as to produce yielding contact between the platen sectors. The openings (not shown) in main frame 51 and housing 67 through which shaft 55 protrudes are made large enough to permit slight up and down motion of said shaft, in a manner indicated in Fig. 4 of said patent. Slack in the sprocket chain 58 produced by such movement, or otherwise, is taken up by roller 59 carried by radius arm 70 pivoted on shaft 54 and forced against the inner surface of the chain by tension spring 71 anchored to the end of the long, L-shaped stud 72, screwed into the under side of table 66 (see Figs. 3 and 4).

On the front end of shaft 55 is fastened another sprocket gear 60 (see Fig. 1) which drives shaft 61 through sprocket chain 63 and pinion 62 on said latter shaft which is journaled in housing 69 mounted on arm 68 which extends horizontally from the front side of main frame 51 (Figs. 1 and 3). Shaft 61 carries the wheels 36, 36, for discharging the printed postcards into receptacle 27, as previously described. Receptacle 27 has an end wall 74 held in adjusted position by thumbscrew 73 passing through slot 73a in the bottom of 27. This receptacle is detachably supported by thumbscrew 75 engaging an extension 76 of arm 68, which extension is fastened on said arm by screws 76a.

The ink supplying apparatus, as shown in

Figs. 1 and 4, comprises the inking roll 4 rotating on shaft 80a, mounted in bracket 79 (Fig. 1) extending upwardly from the housing 67, which latter is fastened to the front side of main frame 51, and has a sleeve 77 in which shaft 2 is journaled, said mounting being of the type shown in Fig. 1 of my Patent No. 1,614,547 dated January 18, 1927. It also carries a stud journal for upper gear 6 and has outwardly extending rim flanges 78 for protecting gears 6. Shaft 80a has a crank lug 80 on its outer end by which it may be rotated to a limited extent defined by the toe 80b, striking bracket 79. This permits roll 4 to be slightly lifted up out of contact with platen sector 3 or 3a. It can then be revolved by handle 81. A rotary ink fountain is shown at 82 journaled in eccentric bearings 83 which rest loosely on the forks of another bracket 84 pivoted on shaft 2. The two eccentric bearings 83 are connected by bridge piece 85 so that they can be simultaneously rotated by crank lug 86, so as to slightly raise or lower the rotary ink fountain. Normally these last described parts are held in the position shown in Fig. 1 by weighted lever 87, which forms an extension of crank lug 86, the rotary ink fountain 82 then being in raised position. 88 is a transfer roll fast on a shaft journaled in bracket 84. Tension spring 89 normally holds the transfer roll against the inking roll 4, so that it is rotated by the latter through frictional contact, the inking roll, in turn, being intermittently rotated by contact with revolving platen sector 3 or 3a, when it is in the lowermost position, as shown. When crank lugs 80 and 86 are each rotated about 90 degrees in a clockwise direction inking roll 4 is raised out of contact with the platen sector, and rotary ink fountain 82 is lowered into contact with transfer roll 88. The three can then all be revolved by hand crank 81 to deposit additional ink from the fountain on the transfer roll, and from it to the inking roll. During all periods of revolution of transfer roll 88 it is also given an axial reciprocating movement by the double cam sleeve 90 which is fast on the end of its supporting and engages the loosely pivoted, crescent-headed pin 91, said crescent-head travelling first in one of the double cam grooves and then in the other one.

The stencil collector 28 is of the type described in my above mentioned Patent No. 1,694,619, having two perforated ears 29, 29, by which it may be swung from bracket 92 in either one of two positions, pin 33 passing through either ear 29 and perforated lugs 34 on bracket 92. The reversal of position of stencil collector 28, thus made possible, permits the contained stack of used stencils to be transferred back to the magazine 50, in reversed position so as to print the addresses in reversed positions, if this is desired for any reason, as sometimes occurs in the case of bills or circulars.

The friction drag plate 133, pivoted at 134 in press roll housing 131 (best shown in Fig. 4), serves to prevent the postcards being shot too far along toward the printing zone after they are released by the feeding drum 23. The downward pressure of this plate can be adjusted by moving weight 32 up or down on bent arm 30. This arm has a lower portion of rectangular curvature extending at right angles to its upper portion on which latter the weight slides. The lower, horizontal portion is movable lengthwise in socket 31 formed on the top of plate 133 and having a rectangular interior cross section. This adjustment is to permit the hereinbefore described movement of stencil guide 99, under and outside of which the bent arm 30 extends. As the upwardly extending portion of arm 30 is slightly inclined to the left of a vertical line (looking at Fig. 4), the lever arm of weight 32 with reference to pivot 134 is increased when it is raised, and decreased when it is lowered, thus varying the friction of plate 133 on the postcards passing beneath it.

When the machine is in position of rest, operating crank 1 rests on pawl 115 pivoted on the side of housing 67. (See Fig. 2.)

Figure 15:
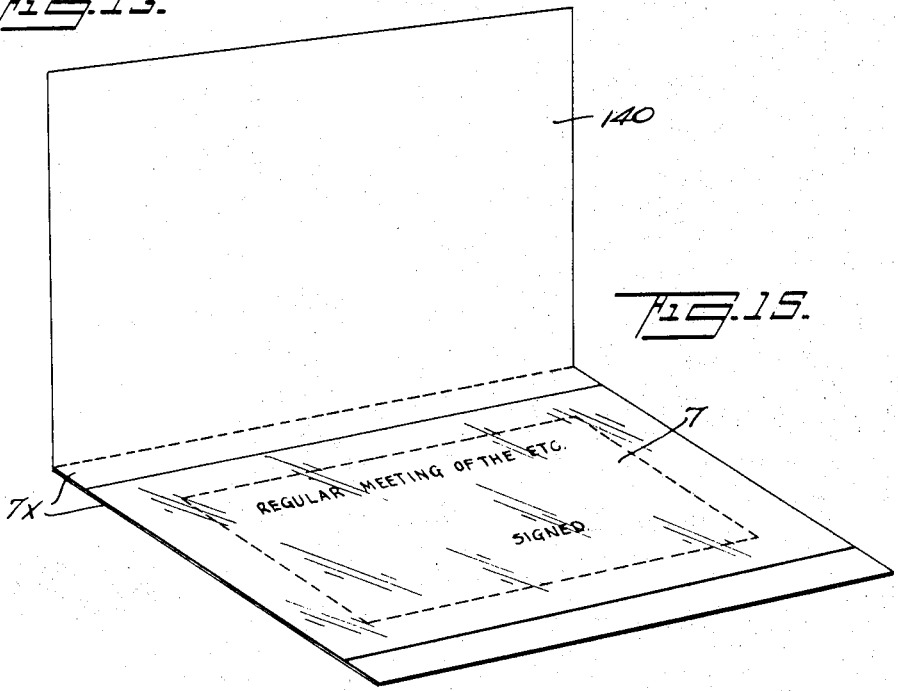
Fig. 15 is an enlarged perspective view of a message bearing stencil.
Figure 16:
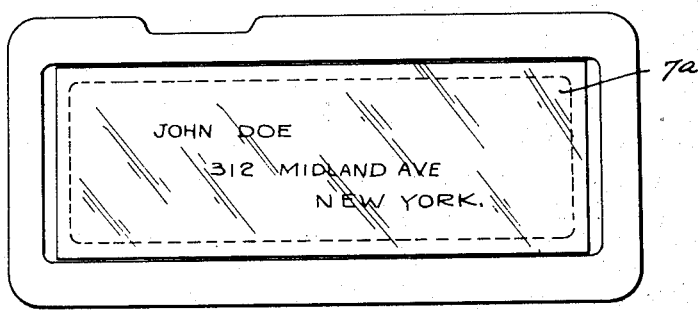
Fig. 16 is a plan view of an address bearing stencil.

The blanks from which stencils 7 are made may have a flap 140 attached thereto as shown in Fig. 15. This is folded under when the blank is being stencilized on a typewriter. After stencilizing this flap is torn off, or before the stencil is inserted in carrier 8 for use.

The body of this blank is preferably made of a thin, loose fibred paper which has been coated with a film of a material which will be displaced by blows of the type when being written on in a typewriting machine to form a stencil in the well known way. The same is true of the smaller stencil 7a.

When the stencil guides are moved toward one another to receive and guide the narrower address bearing stencils 7a, which cooperate with the narrower faced platen sector 3a, said guides are then located over the lower, pressure platen sector, or anvil as it is sometimes called, and in the printing operation the thin, coated paper of the stencil is flexed downward, as shown in Fig. 10. Such flexure occurs also to about the same extent when the wider, message bearing stencil 7, in its carrier 8, is used.

The slightly modified form of apparatus shown in Figs. 17 to 21 inclusive is principally distinguished from the form heretofore described in that it has a special form of ink supplying unit. Also there is a modified form of receptacle 27 for the printed cards or envelopes, and the clips 93, 93, on the ends of the stencil guides 9 and 99 are provided with thumb screws 167, 167, for clamping them in any position of adjustment. (See Fig. 19.) These guides are rather long and as the adjusting apparatus for stencil cards of different widths is located at the extreme end of these guides, the other ends carrying these clips 93, 93, if left free, may move slightly, sufficiently to permit the stencils to drop out of the guide slots, unless these free ends are clamped by some means such as the thumb screw 167.

The modified form of ink supplying unit shown in these figures is specifically designed to overcome the difficulty occasionally arising in printing from large stencils such as shown in Fig. 12.

In the construction shown in Figs. 1 and 3 the ink distributing roll 88 is supported on a forked bracket 84, which is pivoted at one side of the inking apparatus and pulled up by spring 89. As the result of this there may be a slightly greater pressure of the distributing roll 88 on the inking roll 4 at that side of the machine than at the other side, and consequently more ink deposited on the inking roll at that end. This, in turn, may cause a portion of the matter stencilled in the message stencil, or any other large stencil being used, to be printed much more heavily than is the rest of the matter appearing near the other edge of the stencil. To avoid this possibility, I may substitute the ink supplying unit illustrated in Figs. 17 to 21 in which the ink fountain, distributor and inking roll are all journaled in one housing which is pivoted to one side of the printing zone with a slightly loose journal bearing, and the inking roll allowed to then rest by gravity on the upper platen sector. Approximately one half of the weight of this entire ink supplying unit is then exerted in forcing the inking roll 4 down upon the platen sector and, the force of gravity being evenly applied throughout the axial length of said inking roll, there is an even transfer of ink from it to the ink carrying platen sector. An even distribution of ink on the surface of the inking roll 4 is assured by mounting its journals in slotted bearings and providing springs which evenly pull the inking roll in a horizontal direction into contact with the ink distributor. Similarly the cylindrical ink fountain is loosely journaled in vertical slots in the housing over the ink distributor so that an even contact is assured from end to end between these elements.

Referring to the drawings, 141 represents an extension cast on the housing 67 which has been previously described as a support for various portions of the mechanism. This horizontal extension has the shaft 142 rigidly mounted in its outer end. On this shaft 142 is loosely pivoted the forked housing 143, which is provided at the end of the upwardly turned forked ends with horizontal extension housings 143a. A much smaller U-shaped housing 144 is pinned to the shaft 142 by pins 144a, best shown in Fig. 20, and this U-shaped housing straddles the perforated lug 143b on housing 143 by which the latter is hinged to shaft 142. As the result of the construction so far described, the housing 143, 143a, is supported by a hinge at one end having a horizontal axis and is prevented from lateral sliding on shaft 142 by the U-housing 144. The shaft 145 of the inking roll 4 is loosely journaled in the horizontally extending slots formed by the forked ends 146 of housing extension 143a. Clips 147 on each end of shaft 145 are connected to tension springs 148, the other ends of which are anchored on the housing at 149. Split pins 150 close the open ends of forks 146 and prevent the inking roll being removed while they are in position. 151, 151 are upwardly opening forks on the other end of housing extension 143a in which may rest the journals 82a on either end of the cylindrical ink fountain 82. The ink fountain is retained in these forks by split pins 152. One head of the cylindrical ink fountain has a central bore 154, as shown in Fig. 21, which serves as a feed duct leading to the interior of the fountain. This feed duct may be closed by the screw plug 155. To facilitate the pouring in of the ink through the duct 154, its outer end is provided with a flaring cylindrical cup 153, the outer peripheral surface of which is preferably knurled. The other journal of the ink fountain is provided with an axial projection having a knurled head 156. (See Fig. 18). These knurled extensions provide convenient means for raising the cylindrical ink fountain by hand, lifting it into or out of the journal forks 151, and refilling it with ink, when desired.

The form of ink fountain shown in Figs. 17, 18, 19 and 21 is designed for use with ink of the consistency of paste, and is of the type shown in my Patent 1,036,200 granted August 20, 1912, while that shown in Figs. 1 and 3 is designed to use with liquid ink and is constructed and operated as described in my Patent No. 1,614,547 dated January 18, 1927, the cylinder in this form having perforations through only a portion of its surface, and that portion being normally held uppermost by a weight attached to the interior of the cylinder at a point diametrically opposite said holes. This is necessary to prevent the liquid ink from leaking out continuously. When the ink-containing cylinder is rotated by contact with distributor roll 88, the fluid ink exudes through the holes when they pass through the lower arc of revolution.

The paste ink on the other hand will not be forced through the holes in the cylindrical container 82 by gravity nor by centrifugal force alone. Consequently the cylinder may have holes all around its circumference and may rest on the distributor roll 88 at all times, as shown in Figs. 17 and 18, and so be constantly revolved by the latter. When ink is to be fed out the operator grasps the knob 156 and holds it stationary while the inking rolls and fountain are being revolved. Thereupon a scraper in the interior of cylinder 82, attached to said knob, (not here shown but illustrated and described in my said Patent No. 1,036,200) is held stationary and squeezes the ink past out through the holes as one line of them after another comes opposite the scraper.

The ink distributing roll 88 is journaled in the housing 143 at 88a, beneath the ink fountain 82 and to one side of the inking roll 4, and, as the result of the entire before described construction, these three elements mounted in the housing 143, 143a, form a complete ink supplying unit, which is supported at one end by the hinge formed by the perforated lug 143b and shaft 142, and at the other end by the inking roll 4, resting on the ink bearing platen sector of the printing apparatus. The distributing roll shaft 88a is provided with the double cam sleeve 90, as before, but it is placed at the rear end of the shaft, as shown in Figs. 18 and 19, and this, as before, cooperates with the pivoted crescent headed pin 91, to cause an automatic endwise travel of the ink distributing roll as it revolves. The distributor shaft 88a is also provided with hand crank 179 by which it may be manually rotated to increase the amount of ink on the surface of the inking roll 4.

As the result of the construction described an even distribution of ink is always obtained since the cylindrical ink fountain 82 rests freely on the distributing roll 88, and the inking roll 4, loosely journaled in the housing is pulled against said distributor roll with an even pressure throughout its line of contact therewith and rests upon the upper platen section 3 or 3a with a similarly even pressure.

To temporarily hold this ink supplying unit in a slightly raised position so that the inking roll 4 will not rest upon the platen sector 3 or 3a, as well as to prevent its dropping too far when the cutaway portion of such a sector comes under it, I provide the rotatable plug 157, journaled in the U-housing 144, and provided with the crank lug 158 by which it may be rotated within the quadrant limited by the cutaway section 164 of the outer flange 159 on said pin 157, cooperating with the stop pin 165 set in housing 144. A pin 160 is screwed into the other end of plug 157, in a position eccentric to the axis thereof, and this pin is provided with the flange 161 which serves to retain the plug 157 in position in the housing.

162 is a spring washer interposed between the inner face of the U-housing and this flange. 163 is a lug cast on the housing 143, and projecting radially from the hinge thereof into the vertical plane of the eccentric pin 160, and the parts are so adjusted that when the plug 157 is rotated to one extremity of its 90 degree movement the eccentric pin 160 will engage the lug 163 and slightly oscillate the housing 143 sufficiently to lift the inking roll 4 away from contact with the platen sector beneath it, and thereafter support the ink supplying unit in this position of disengagement. When, however, the plug 157 is rotated toward the other extremity of its movement, the inking roll 4 first drops down into contact with the full faced portion of the platen sector, and pin 160 thereafter moves away from lug 163 a slight distance to leave the hinged mounting of the ink supplying unit free. Also, when the platen sector revolves and its cutaway portion comes under roll 4, the housing 143 drops a slight distance and lug 163 again engages pin 160, to support roll 4 until the full faced portion of the platen sector comes under it again.

166 is a screw with a partly cutaway head mounted in the upper portion of the perforated lug 143b forming part of the hinge for housing 143, and this screw is so located that when housing 143 is swung upward to a predetermined extent, this screw head will engage the eccentric pin 160 and serve as a stop to prevent the unit being tipped over backward.

The receptacle 27 for the printed cards or other articles is of the same general construction as before described and shown in Figs. 1, 2 and 3, except that the rear side wall is removed and the contents prevented from sliding out on that side by a vertically arranged plate 168, which is pivoted at 169 to a horizontally swinging arm 170 which is mounted on the main frame by the pivot pin 171, having a substantially vertical axis. Preferably the bottom of the receptacle 27 has its corner adjacent to plate 168 beveled off as shown at 172 in Fig. 19, and the connection between plate 168 and swinging arm 170 is formed by a U-clip 173 fastened to plate 168, and in which clip the pivot pin 169 is mounted. 174 is a spiral spring surrounding the pin and confined between the lower lug of the U-clip 173 and the washer 175, which latter is thereby pressed upward against the under side of the arm 170. This construction provides a slightly flexible mounting of the plate 168 on the arm 170, and also a spring pressed friction joint which normally tends to hold the parts in the position assumed when the plate is forced up against the beveled edge 172 of the receptacle bottom, as indicated in Fig. 19. The parts are maintained in this position while the printed articles are accumulating in the receptacle 27. When the operator wishes to empty the receptacle he pulls the swinging arm 170 out into the broken line position shown in Fig. 19, which allows the articles to be easily slid out of the open side of the receptacle, thereby left unguarded.

In this particular modification the postcard discharge friction wheels 36, 36, are belt driven, instead of chain gear driven as in the construction shown in Fig. 1. This belt drive comprises the pulley 176 on the shaft 54 of the feed drum 23, the small pulley 177 on shaft 61 of the card ejector wheels, and the belt 178 running over said pulleys.

One field of use for which this invention is particularly well adapted is the printing and addressing of postcards bearing notices, etc., for mailing to members of a club or other association. In such case the secretary of the organization will prepare a set of stencils like 7a bearing the names and addresses of the members and keep these for repeated use. Whenever he has to send out a notice of a particular meeting of the organization to all members thereof he also prepares a stencil 7 bearing the proper message. He then places this in stencil holder 8, adjusts the stencil guides 9 and 99 the proper distance apart, as shown in full lines in Fig. 2, to receive this carrier, adjusts the card magazine 24 at the proper width to receive the postcards, and places the wide faced inking platen sector 3 on shaft 2. To do the latter he swings the crank lug 80 to the right (in clockwise direction) to lift the inking roll 4 so that it will not bear on the inking platen sector. When platen sector 3 has been placed in position on shaft 2 the crank lug 80 is swung back into the position shown in Fig. 1, producing operative contact between inking roll 4 and the broad faced platen sector 3. After a stack of postcards have been so placed in magazine 24 that their faces designed to bear the message will be on the upper sides thereof, the handle 1 is revolved in a clockwise direction (looking at Fig. 1). When the platen sectors rotate into the position shown in broken lines in Fig. 5 they will then grasp the front portions of the sides of stencil carrier 8 and the front end of a postcard 21, which latter has also been brought forward into broken line position below the stencil carrier and the two are thereby pulled through between the platen sectors 3 and 5, with the result that the message is stencilled on that postcard and the latter discharged into receiver 27. When the platen sectors reach a position slightly beyond that shown in full lines in Fig. 5, the stencil carrier 8 is released by them and pulled back by spring 10 into its position of temporary rest, ready for another printing operation on the next postcard.

As the feed drum 23 is of much larger diameter than are sectors 3 and 5, and rotates at the same angular speed (i. e. makes the same number of revolutions per minute) each successive postcard is fed forward rapidly during or just before, the time when the cutaway portions of the sectors are opposite one another. Thus each card is fed forward into the broken line position shown in Fig. 5 while the stencil carrier 8 is still at rest, or just before it is pulled back to that position. The revolutions of drum 23 and the platen sectors are so timed that the roughened rubber band 35 is in contact with a postcard during this period only. During the greater portion of the remainder of each cycle of operations (i. e. that period while one card and the stencil are being run between the sectors for the printing operation) the drum 23 exerts no feeding action on the next card, but the roughened feeding surface 35 completes a revolution and grasps such next postcard just in time to feed it forward into the "bite" of the sectors when the latter have again reached the broken line position shown in Fig. 5, and are about to begin another printing operation.

When all the postcards have thus had the message printed thereon they are restacked by the operator in magazine 24 with their unprinted faces uppermost, and the stencil carrier 8 is removed from the stencil guides 9 and 99, which are moved toward each other into the position shown in Fig. 9. The inking platen sector 3 is then removed and the narrower faced platen sector 3a substituted for it, connecting rod 38 being hooked over pin 40 on stencil feed slide 41. A stack of narrower address bearing stencils 7a are then placed in magazine 50, and the rotation of crank 1 then prints an address on the proper face of each of the postcards as stencils 7a and postcards 21 are fed together through the machine by claw 43, drum 23 and sectors 3a and 5. The printed postcards are thus again deposited in receiver 27 and are ready for mailing. The used stencil cards 7a are pushed along guides 9 and 99 and deposited one at a time in stencil collector 28, from which they may be removed and stored away ready for use again on the next occasion, when another notice is to be mailed to the club members.

The address printing platen sector 3a has a shorter, as well as a narrower, face than has either the lower platen sector 5 or the message printing sector 3. This is because the address bearing stencils 7a are shorter and narrower than the message bearing stencil 7, since a smaller printing field is needed for the few words in a mailing address, as compared with the more lengthy message to be printed on the other face of each postcard. The sectors 3a and 5 are, however, so timed that the "bite" between them occurs at about the same point in each cycle of operations (see Fig. 8) as it occurs between sectors 3 and 5. (See broken line positions in Fig. 5). The crank pin 49 is so located as to cause a stencil 7a to have been fed forward into position to be seized by sectors 3a and 5, just before this "bite" occurs. A postcard has been fed into position under the stencil at this same time (see Fig. 8) as in the case also of message printing previously described. The effect of the shorter face of sector 3a, therefore, is merely to release each stencil 7a and post card 21 at an earlier period in each cycle than that at which a longer message bearing stencil 7 and cooperating postcard is released. As the completion of the discharge of the postcard is, however, effected in both cases by the friction wheels 36, this earlier release of it by sectors 3a and 5 does not matter.

Among the advantages possessed by the hereinbefore described invention may be mentioned its flexibility of use for many different purposes and with all kinds and shapes of stencil (within wide limits).

It may be used to print and address notices and announcements to members of an organization, or to customers of a business house, or it may be used for straight printing of circulars or for straight addressing of envelopes. All the present standard sizes of address bearing stencils may be run through it, either end first, so that it is universally adaptable to all present requirements of the stencil printing art.

Having described my invention, I claim:

1. In a printing apparatus employing stencils, a pair of revoluble platen sectors, one of which is adapted to carry ink, cooperating with said stencils, and means for presenting a stencil to said platen sectors when rotating, the combination, with said above recited apparatus, of a revoluble shaft for supporting the upper platen sector having a free end projecting beyond its journal bearing, mechanism for rotating said shaft, and detachable elastically yielding means for holding said sector upon said projecting shaft end and clutching it thereto, whereby any such sector may be removed to permit the substitution of another having a corresponding clutch member, but adapted to produce a printing field of different form or area.

2. A combination such as defined in claim 1, in which said detachable connection comprises a circumferentially grooved section near the end of said shaft and a spring pressed pin carried by said sector and adapted to engage said groove.

3. A combination such as defined in claim 1 in which said platen sector is provided with an axially projecting knob by which it may be grasped for removal from said supporting shaft.

4. A combination such as defined in claim 1 in which said means for presenting a stencil to said rotating platen sectors comprise two parallel, oppositely grooved guides which are adjustable toward or from one another; whereby stencils of different widths may be fed to the printing zone.

5. A combination such as defined in claim 1 in which said means for presenting a stencil to said rotating platen sectors comprise two parallel, oppositely grooved guides which are adjustable toward or from one another, and a stencil feed slide mounted on one of said guides.

6. An apparatus such as defined in claim 1 in which said removable platen sector has an ink bearing face and a crank pin mounted on one end and projecting beyond said shaft, and in which said means for presenting a stencil to said revolving platen sectors comprise two parallel, grooved guides, said apparatus being combined with a stencil feed slide mounted on one of said guides and a link detachably pivoted to said slide and to said crank pin.

7. In a printing apparatus of the class described the combination of two platens disposed one above the other, the upper one of which is adapted to carry ink and make contact with the other intermittently, a pair of parallel, oppositely grooved, horizontally disposed guides extending one on either side of said upper platen and over the outer edges of the lower platen, a stencil adapted to fit into and slide along said grooves in said bars and having a flexible stencilizing area, and means for moving said stencil along said guides to a position between said platens; whereby, when said platens intermittently grip said stencil and any article on which printing is to be done introduced between them simultaneously in a printing operation, the printing area of said stencil will flex downwardly into contact with such article supported on the lower platen.

8. A combination such as defined in claim 7 in which said guides are adjustable toward and from each other; whereby stencils and upper platens of different widths may be employed.

9. In a printing apparatus the combination of two oppositely disposed, revoluble platen sectors, one of which has a face of less width than the other and which is adapted to carry ink thereon, a pair of parallel, oppositely grooved stencil guides extending one on either side of said narrower platen and tangential to the extremities of the other platen, a stencil adapted to fit in and slide along said guide and having a stencilizing panel of flexible material, and means for simultaneously revolving said sectors in opposite directions; whereby, when such stencil is placed in said guides with one end projecting into the bite of said revolving sectors and a sheet to be printed is similarly placed between said stencil and said wider platen, a printing operation may be performed with equal facility whatever the width of the face of the ink-bearing platen sector so long as it is no wider than the flexible panel in said stencil.

10. A combination such as defined in claim 9 in which said guides are adjustable toward and from one another; whereby stencils of different widths may be employed.

11. In a printing apparatus having a pair of oppositely revolving platen sectors journaled on a main frame, and a pair of parallel, oppositely grooved stencil guides located in a plane passing between and parallel to the axes of said sectors, the combination, with said above described apparatus, of adjustable means mounted on said frame for holding said guides at different distances apart to accommodate stencils of correspondingly different widths comprising a housing on said frame near one end of said guides, and two guide bars movably mounted in said housing and extending substantially at right angles to said guides, one guide being fastened to one of said bars and the other guide to the other bar.

12. A combination such as defined in claim 11 in which said means comprises a spring clamp for holding said slide bars in various positions of adjustment.

13. A combination such as defined in claim 11 in which said means also comprises a bracket extending across said frame near the other ends of said guides and with which bracket the other ends of said guides have sliding engagement.

14. A combination such as defined in claim 11 in which said means also comprises notches in said bars and a sliding key mounted in said housing and adapted to engage said notches.

15. A structure such as defined in claim 11 combined with a vertically divided, two-part stencil magazine, one part of which is mounted on and carried by one guide, while the other part is mounted on and carried by the other guide, one of said magazine parts being cut away underneath to afford room for the reciprocation of a stencil feed slide, together with such feed slide mounted on the supporting guide beneath said magazine part.

16. In a printing apparatus the combination with a pair of parallel, oppositely grooved stencil guides, one of which is slotted, of a stencil feed slide mounted on and under said slotted guide and having a feed claw projecting upwardly beside the groove therein, said slide having an upwardly and inwardly bent clip engaging the other edge of said guide, a pin extending upwardly through said slot, and spring pressed means mounted on said pin and engaging the upper surface of said guide; whereby said claw is yieldingly held opposite said groove in the guide on which it is mounted.

17. In a printing apparatus the combination of mechanism creating a printing zone and laterally adjustable guides for conducting stencils of different widths to said printing zone, a magazine for a stack of cards to be printed, guides for conducting said cards from said magazine to said printing zone located below said stencil guides, and mechanism for feeding cards one at a time out of said magazine and discharging them into said guides, an adjustable friction device for preventing said cards being shot too far into said guides, which device comprises a pivoted tongue resting on each card as it enters said guides, an arm projecting upwardly from said tongue alongside the outer edge of one of said stencil guides and inclined away from the pivot thereof, and a weight adjustable in position along said arm, said arm being adjustable laterally on said tongue to accommodate lateral adjustments of said stencil guides.

18. In a stencil printing apparatus comprising a continuously driven ink-carrying impression mechanism, means for feeding a series of relatively narrow stencils successively toward said mechanism and a detachable driving connection between said means and said mechanism, the combination of a rectangular carrier frame for holding a relatively wide flexible stencil sheet installed in said apparatus when said first mentioned stencil feed is disconnected, and means then effective for retaining said carrier in operative position within the printing zone of said impression mechanism during a plurality of printing operations thereof; whereby a series of names and addresses cut in said narrow stencils may be successively printed on one face of a series of postcards when said first mentioned stencil feeding means is operative, and a single message may be printed on the other faces of all such postcards when said narrow stencil feed mechanism is disconnected.

19. An apparatus such as defined in claim 18 combined with a stencil sheet adapted to be held in such carrier.

20. In a stencil printing apparatus comprising a pair of oppositely disposed and revoluble platen sectors, one of which carries ink, a pair of parallel, oppositely grooved guide bars located in operative relation to the opposed faces of said platen sectors, means for simultaneously revolving said sectors, and easily disconnected means for feeding a succession of relatively narrow, stiff stencils along said guides toward said sectors, the combination of a rectangular frame adapted to receive and carry a wide flexible stencil slidingly mounted in said guides when the first mentioned stencil feeding means are disconnected, a fixed stop for one end of said frame so located as to maintain the other end thereof within the bite of said revolving sectors when it is mounted in said grooved guides, and spring means tending to force said carrier against said stop; whereby said carrier is alternately pulled along said guides between the full faced portions of said sectors by the revolution thereof and then released by them to permit its return by the action of said spring to engagement with said stop.

21. An apparatus such as defined in claim 20 combined with a thin stencil sheet clamped in said carrier.

22. A combination such as defined in claim 20 in which said ink-bearing sector platen has its face divided into three sections by two peripheral grooves located substantially in line with the two inner edges of said carrier frame, whereby the outer face sections so formed and engaging said frame for moving the same may be left free of ink, which may be confined to the sector surface intermediate of said grooves.

23. A combination such as defined in claim 20 in which said stop for limiting the return motion of said frame is located above the plane of said guides and the upper surface of said frame is provided with a bumper adapted to engage said stop, and in which said spring means comprises a slide-member having a laterally extending projection cooperating with a lug on the upper surface of said frame; whereby, on the removal of said frame, the space between said guides is left free for the passage of the first mentioned series of stencil cards for cooperation with said platen sectors in printing a list of addresses or the like succession of legends.

24. In a stencil printing apparatus the combination of a pair of parallel, oppositely grooved stencil guide strips, adjustable toward and from one another, a two-part stencil magazine, a part of which is carried by each of such adjustable guide strips, whereby a correspondingly adjustable stencil magazine results, two revoluble platen sectors journaled, one above and the other below the plane of said guide grooves, with the common tangent plane of their meeting surfaces below the under surfaces of said guide strips, the upper of said platen sectors having a much narrower face than the lower one, means for simultaneously revolving said sectors in opposite directions and means for applying ink to the narrower one, a series of stencils adapted to be stacked in said magazine and successively slid along said guides toward said sectors, each of said stencils comprising a relatively stiff rectangular frame and a stencilizing panel of flexible, yielding, coated paper of a width slightly greater than that of the face of the ink bearing sector, and mechanism for feeding said stencils from said magazine and along said guides to said revolving platen sectors; whereby printing operations may be successfully performed whether or not the stencil guide strips are adjusted so as to overlap the lower platen sector face, thereby rendering it possible to use at will stencils of widely varying widths, together with platen sectors of correspondingly varying face widths.

25. In a printing apparatus comprising a series of stencils and a pair of oppositely grooved guides along which said stencils may be fed, the combination, with the above described apparatus, of mechanism for supporting said guides which is adjustable so as to permit them to be spaced apart various distances to accommodate stencils of different widths, and a feed claw mounted, and adapted to slide, on one only of said guides.

26. A structure such as defined in claim 25 combined with a two-part stencil magazine having one vertically arranged half portion mounted on one grooved guide, and its other vertically arranged half portion mounted on the other grooved guide.

27. In a printing apparatus comprising a pair of revoluble platen sectors, one of which is adapted to carry ink and thereby, in co-operation with the other, form a printing zone, together with a pair of oppositely grooved parallel guide bars and mechanism easily connected to and disconnected from one of said sectors for moving stencils along said grooves successively toward and between said sectors, the combination of means for retracting a single stencil after each printing operation performed in said zone when said first mentioned stencil feed mechanism is disconnected, which said means are located entirely outside of the space between said grooved guides; whereby, when said means are in operation and said first mentioned mechanism is disconnected, repeated printings from one stencil may be obtained, but when said means are not in operation a series of stencils may be fed uninterruptedly along said guides to said printing zone for printing successively different legends.

28. In an addressing machine comprising mechanism adapted primarily to print consecutively a series of names from a series of name bearing strips of relatively narrow impression area, which has an ink bearing platen, means comprising an ink bearing platen, means easily connected to and disconnected from said impression for feeding such strips successively to and through the printing zone of said mechanism, the combination of easily separable means for supporting and rotating said ink bearing platen, whereby said platen may be quickly connected to or disconnected from the rest of the mechanism and replaced by another having an ink bearing area of greater width, a printing strip having a relatively wide printing area, and means for retaining it operative within said printing zone during a plurality of printing operations when said first mentioned strip feeding apparatus is disconnected; whereby a series of names and addresses borne by said narrow printing strips may be successively printed on one face of each of a series of postcards when said first mentioned strip feeding mechanism is in operation, and a single message occupying a much larger impression area may be printed on the other faces of all of said postcards when said first mentioned strip feeding mechanism is disconnected.

29. A structure such as defined in claim 25 combined with a vertically divided, two-part stencil magazine, one part of which is mounted on and carried by one guide, while the other part is mounted on and carried by the other guide, one of said magazine parts being cut away underneath to afford room for the mounting and reciprocation of the feed claw on the guide beneath it.

30. A printing apparatus comprising, in combination, a revoluble pressure platen having a relatively wide face, a revoluble shaft located above said platen and parallel to the axis thereof, an ink bearing sector adapted to be slid on said shaft so as to rotate therewith, a pair of interlocking clutch elements, one of which is fixed in said shaft and the other on said sector, the two elements being so intermeshed as to be easily separable whenever said sector is slid off the free end of said shaft, mechanism for rotating said pressure platen and said shaft in opposite directions, an ink supplying roll in operative contact with said ink bearing sector and having a breadth of face substantially equalling that of said pressure platen, and laterally adjustable guides along and between which a stencil may be slid between said sectors; whereby, when a stencil narrower than the face of said pressure platen is to be used a correspondingly narrow ink bearing sector may be operatively mounted on said shaft and said guides may be adjusted toward one another over said pressure platen to support said stencil, but when a wider printing area is desired said guides may be spread apart to expose practically the full width of said pressure platen.

31. A combined addressing and printing machine comprising, in combination, a single ink-supplying device of a predetermined maximum ink-delivering area, a single pressure platen having an effective face area at least equal to that of said ink-supplying area and located opposite thereto, means for guiding a series of articles to be printed successively through the space between said ink-supplying device and said platen, means for guiding stencils of different widths to and through said space, and an ink-bearing platen cooperating with said pressure platen and said ink-supplying device which is easily removable so that it may be quickly replaced by another having a different area of cooperating face; whereby the areas of the ink impressions applied to such articles, and the printed areas thereby produced, may differ, within the maximum limited by the ink-delivering area of said ink-supplying device.

32. In an addressing machine comprising a revoluble pressure platen sector, an inking roll located above said sector and revoluble upon an axis parallel to the axis about which said sector revolves, a revoluble shaft located between the two above-mentioned elements and having a journal bearing at one end only, means for synchronously rotating said sector and said shaft, an ink-carrying sector adapted to slide on and off the free end of said shaft endwise thereof and to rotate in contact with said inking roll, means for causing said last mentioned sector to rotate with said shaft when mounted thereon, and means for guiding articles to be printed between said sectors; whereby said ink bearing sector can easily and quickly be removed and other suitable ink applying means cooperating with said inking roll substituted therefor and similarly mounted on said revoluble shaft when desired.

33. A stencil printing apparatus comprising, in combination, a revoluble pressure platen, a shaft revoluble in a fixed journal bearing and extending beyond said bearing opposite said pressure platen and parallel to the axis of the latter, means for synchronously rotating said platen and shaft, an ink carrying platen sector adapted to be slipped on and off the free end of said shaft, and a clutch, one member of which is fast on said platen sector while the other is fast on said shaft; whereby said ink bearing sector can be slid on to said shaft into clutched engagement therewith and in cooperative relation to said pressure platen, or may be slipped off said shaft to allow another ink bearing element to be substituted therefor.

34. An apparatus such as defined in claim 33, combined with a spring controlled latch adapted to releasably hold said platen sector on said shaft.

Signed at Cambridge in the county of Middlesex and State of Massachusetts this 30th day of July A. D. 1930.

HARMON P. ELLIOTT.